United States Patent Office

2,808,109
Patented Oct. 1, 1957

2,808,109

WATER FLOODING COMPOSITIONS

James C. Kirk, Ponca City, Okla., assignor to Continental Oil Company, Ponca City, Okla., a corporation of Delaware No Drawing. Application January 9, 1956,
Serial No. 557,828

4 Claims. (Cl. 166—42)

The present invention relates to the recovery of oil from depleted oil fields and pertains more particularly to methods of flooding such sands with an aqueous oil-displacing solution to obtain a secondary recovery of oil.

Oil exists in well sands or similar strata in two different states, i. e., as free oil that is located between the voids of the sand and as fixed oil which is held by absorption (and perhaps to some degree by adsorption) on the particles of sand and which is commonly referred to as the film of oil that adheres to the particles of sand or the particles of the oleiferous structure. Such fixed oil may be said to be held by "sorption."

Free oil can be recovered by conventional methods of oil producing such as draining the oil in conjunction with liquid or gaseous pressure and creating an artificial fluid or gaseous pressure in the sand bed so as to dislodge the oil from the sand bed and thereafter conduct the dislodged oil to the surface of the ground. Fixed oil, on the other hand, cannot be recovered by any of the conventional methods or means used to produce oil and cannot be dislodged economically by either fluid or gaseous pressure. In some cases, the amount of oil remaining in the well after pumping has become unprofitable may equal 60 percent of the original oil present. Water is introduced under pressure into a number of wells, and oil together with water is produced from other wells by the resultant water drive. Heretofore, many agents such as surface tension reducing and capillary active agents have been proposed as addition agents to the flooding water to increase the efficiency of the water flood. Due to various reasons and/or circumstances, these methods of secondary recovery, however, have not been entirely satisfactory.

Some addition agents are objectionable for the reason that they build up deposits on the strata, thus tending to plug or seal off the less permeable strata. Accordingly, many of the oil-containing channels within the zone are permanently sealed off. In another method, small amounts of certain wetting agents are added to the water which is used as a flooding liquid to desorb the oil from the oil-bearing formation and to facilitate the transport of this oil to the output well. The primary shortcomings of these emulsifiers are:

1. Excessive cost,
2. Limited miscibility with hard water causing plugging of the formation,
3. Reaction with the various inorganic ions present in the well fluids,
4. The inability of the emulsifiers to provide sufficient film strength at the oil-water interface to prevent the break through of columns of water into the oil-rich zone and final channelling of water to these columns of the output well, and
5. The decomposition of the addition agent during the relatively long periods required to complete the water drive.

It is, therefore, a principal object of the present invention to provide a process for the flooding of oil wells which obviates the disadvantages of the prior art process. Another object of my invention is to provide a method of increasing the ultimate of oil recovery from a given structure containing oil. These and additional objects and advantages of the present invention will be apparent to persons skilled in the art by reference to the following description.

Briefly described, the foregoing objectives are attained by introducing an aqueous oil-displacing solution comprising water, a water-soluble aliphatic alcohol, and a treating or addition agent into a number of oil wells located in an exhausted or abandoned oil field and permitting said oil-displacing solution to travel through the subterranean oil sands or oil-bearing strata and rise to the surface of the ground through a predetermined opening. The treating or oil-displacing solution employed as the flooding medium operates to liberate the film or coating oil on the particles of the oleiferous structure and then flush the oil off said particles and carry the oil upwardly to the surface of the ground.

In order to disclose the nature of the present invention still more clearly, the following illustrative examples will be given. It is to be understood that the invention is not to be limited to the specific conditions or details set forth in these examples except insofar as such limitations are specified in the appended claims. Parts given are parts by weight.

In the following examples, a simple centrifugal method, as described by Dunning, H. N., Johansen, R. T., and Hsiao, Lun, "Displacement of Petroleum From Sand by Detergent Solutions," Bureau of Mines Report of Investigations 5020 (December 1953), was used to determine the displacement efficiency of a sodium alkaryl sulfonate in a petroleum sand system. The sand (Ottawa sand) initially was cleaned with hot chromic acid, washed thoroughly with tap water, distilled water, and acetone and dried at 110° C., until it would flow freely. The crude oil was topped under vacuum to remove the more volatile ingredients. This treatment minimized erratic results caused by evaporation during the determinings and caused only minor changes in the specific gravity and viscosity of the crude oil. The particular crude oil used in these tests was obtained from the Grubb lease in California. Properties of this crude oil were as follows:

Specific gravity at 60/60° F_____ 0.828
Viscosity at 25° C_____cps__ 2.68

In running the tests, the sand was mixed with sufficient oil to wet the sand surface but insufficient to cause gravity drainage of the oil. Solutions of distilled water and the detergent (sodium alkaryl sulfonate having a combining weight of 410) were prepared in a concentration of 1500 p. p. m. of active detergent in the water. These solutions were prepared by adding 1.5 grams of the active detergent, which was then placed in a 1,000 ml. volumetric flask and water added to volume.

Twenty-five grams of the synthetic oil sand was placed in a graduated olefin hydrocarbon test bottle. The bottle was then filled to the reference mark with 40 ml. of the 1500 p. p. m. detergent solution. The tests were run in batches of six samples in which one of the tubes contained distilled water as a standard. Each tube initially was centrifuged for 15 minutes, removed from the centrifuge, tilted to about 45 degrees, swirled gently to allow release of oil, and centrifuged for another 10 minutes. This treatment was repeated four times, and after each centrifuging the amount of oil displaced from the water was measured directly in the calibrated neck. Although the oil volume readings had not reached a constant value, the oil volume after the fifth centrifuging was taken as the amount of oil displaced from the sand. As a constant oil value was not reached and it was impossible to give each sample exactly the same amount of agitation, each test was repeated three times and an average of the results taken. The results are represented as displacement efficiencies. The term "displacement efficiency" is defined as the amount of oil displaced from the synthetic oil sands by a detergent solution relative to the amount displaced from corresponding sand samples by distilled water. Results obtained in this test are subject to random errors in the sampling of the oil sand.

The experiments, together with the results, are summarized below.

| Detergent Composition | Displacement Efficiency |
|---|---|
| Aryl S-38 | 1.40 |
| Dried Aryl S-38, plus 500 p. p. m. isopropyl alcohol | 1.44 |
| Dried Aryl S-38, plus 1,500 p. p. m. isopropyl alcohol | 1.43 |
| Dried Aryl S-38, plus 4,500 p. p. m. isopropyl alcohol | 1.45 |
| Dried Aryl S-38, plus 1,500 p. p. m. methyl alcohol | 1.43 |
| Dried Aryl S-38, plus 1,500 p. p. m. tertiary butyl alcohol | 1.44 |

The detergent composition used in the foregoing experiment is available commercially under the trade name Aryl S-38 from Continental Oil Company. Typical characteristics of this composition are as follows:

39.4% sodium alkylbenzene sulfonate having a combining weight of 410
33.2% isopropyl alcohol
24.9% water
0.02% sodium sulfate
0.85% sodium carbonate
1.56% unsulfonated oils
Completely miscible with water The dried Aryl S-38 was drum dried commercial Aryl S-38 in the form of light tan flakes containing 96.4% active detergent. We have found that the amount of Aryl S-38, dried or the commercial product in the aqueous solution used as a water-flooding composition may be varied over a rather wide range. If a small concentration of the S-38 is used, the displacement efficiency decreases directly as the concentration decreases. A higher concentration than .15 percent (1500 p. p. m.) may be used with a corresponding increase in the displacement efficiency. Higher concentrations, however, are generally not preferred because of economics. Generally, we have found that the addition of inorganic materials to the water-flooding composition as builders enhances the displacement efficiency. When such is true, the use of these builders is preferred, because the builders are much less expensive than the detergent. In addition to the particular detergent used herein, other sulfonates may be used. We have found, however, that if the sulfonate has a higher combining weight than 410, the product is not completely miscible with water. On the other hand, if the molecular weight of the sulfonate is less than 410, the resulting product is not as effective as the preferred sulfonate.

We have found that a composition consisting of the S-38 and water is not as effective as a displacement fluid as one containing a water-soluble alcohol. In addition to increasing the displacement efficiency of the composition, the presence of the alcohol renders the product water miscible. That is, the S-38 detergent plus an equivalent or greater weight of alcohol, is miscible for all purposes with hard water. The miscibility test can be described as follows: Tap water is added with agitation in 5 cc. increments to 50 cc. of the additive at room temperature to turbidity or until 50 cc. of water has been added. The amount of water which may be added without causing turbidity is a measure of the miscibility of the particular additive in water. The S-38 detergent was found to be completely miscible with hard water by this test in that 50 cc. of the S-38 detergent diluted with an equal volume of water remained clear. Water miscibility is very important, particularly because, if the components of the flooding composition are not miscible, the use of such a material to flood a reservoir will result in the plugging of the formation.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A flooding process for recovering oil from subterranean sands and other oil-bearing strata which comprises flooding said subterranean sands and other oil-bearing strata with an aqueous oil-displacing solution comprising water, a sodium alkaryl sulfonate having a combining weight of 410, and a water soluble aliphatic alcohol.

2. A flooding process for recovering oil from subterranean sands and other oil-bearing strata which comprises flooding said subterranean sands and other oil-bearing strata with an aqueous oil-displacing solution comprising water, a sodium alkaryl sulfonate having a combining weight of 410, and isopropyl alcohol.

3. A flooding process for recovering oil from subterranean sands and other oil-bearing strata which comprises flooding said subterranean sands and other oil-bearing strata with an aqueous oil-displacing solution comprising water, a sodium alkaryl sulfonate having a combining weight of 410, and methanol.

4. A flooding process for recovering oil from subterranean sands and other oil-bearing strata which comprises flooding said subterranean sands and other oil-bearing strata with an aqueous oil-displacing solution comprising water, a sodium alkaryl sulfonate having a combining weight of 410, and tertiary butyl alcohol.

References Cited in the file of this patent
UNITED STATES PATENTS 2,531,166    Shaw _____ Nov. 21, 1950

OTHER REFERENCES

Bonnet: Treatment of Oil Sands With Surface-Active Chemicals, copy of talk before American Petro-Institute, May 22, 1941.